(12) United States Patent
Bauman et al.

(10) Patent No.: US 9,009,490 B2
(45) Date of Patent: Apr. 14, 2015

(54) IMPLEMENTING DYNAMIC BANDING OF SELF ENCRYPTING DRIVE

(71) Applicant: International Business Machines Corporation, Armonk, NY (US)

(72) Inventors: Scott A. Bauman, Rochester, MN (US); Joseph R. Edwards, Rochester, MN (US); Michael S. Faunce, Rochester, MN (US); Robert E. Galbraith, Rochester, MN (US); David R. Kahler, Tucson, AZ (US); Karl A. Nielsen, Tucson, AZ (US); Michael T. Roble, Mazeppa, MN (US); Mark Yadlosky, Rochester, MN (US); Michael J. Anderson, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 246 days.

(21) Appl. No.: 13/646,820

(22) Filed: Oct. 8, 2012

(65) Prior Publication Data

US 2014/0101455 A1 Apr. 10, 2014

(51) Int. Cl.
*G06F 11/30* (2006.01)
*G06F 12/14* (2006.01)
*G06F 11/10* (2006.01)
*G06F 21/80* (2013.01)
*G06F 11/20* (2006.01)

(52) U.S. Cl.
CPC ............ *G06F 21/80* (2013.01); *G06F 11/1092* (2013.01); *G06F 11/2094* (2013.01); *G06F 2221/2143* (2013.01)

(58) Field of Classification Search
USPC ......................................................... 713/189
See application file for complete search history.

(56) References Cited

U.S. PATENT DOCUMENTS

| 8,140,865 | B2 | 3/2012 | Kahler et al. | |
|---|---|---|---|---|
| 2003/0051236 | A1* | 3/2003 | Pace et al. | 717/177 |
| 2008/0189469 | A1* | 8/2008 | Mettler et al. | 711/100 |
| 2010/0023782 | A1 | 1/2010 | Prakash et al. | |
| 2010/0205453 | A1* | 8/2010 | Kahler et al. | 713/189 |
| 2011/0258456 | A1* | 10/2011 | Lyakhovitskiy | 713/189 |
| 2011/0264925 | A1 | 10/2011 | Russo et al. | |
| 2011/0276806 | A1* | 11/2011 | Casper et al. | 713/189 |
| 2012/0110260 | A1* | 5/2012 | Chavda et al. | 711/114 |
| 2012/0110262 | A1 | 5/2012 | Zhang et al. | |
| 2012/0124391 | A1 | 5/2012 | Aono | |
| 2012/0144209 | A1 | 6/2012 | Kahler et al. | |

OTHER PUBLICATIONS

"Toward Standardization of Self-Encrypting Storage", by Laszlo Hars, Security in Storage Workshop, Baltmore Sep. 25, 2008, pp. 1-22.

* cited by examiner

Primary Examiner — Kambiz Zand
Assistant Examiner — Stephen Sanders
(74) Attorney, Agent, or Firm — Joan Pennington

(57) ABSTRACT

A method and controller for implementing dynamic banding of a storage device, such as a Self Encrypting Device (SED) in a data storage array, and a design structure on which the subject controller circuit resides are provided. The controller dynamically identifies band boundaries for the storage device at the time a data storage array is created, when one or more devices are added into an existing data storage array, and when a replacement device is rebuilt into an exposed array, or an array with a failed device. A storage device band definition is provided based upon the dynamically identified band boundaries for the storage device.

23 Claims, 10 Drawing Sheets

IMPLEMENTING DYNAMIC BANDING OF SELF ENCRYPTING DRIVE

FIELD OF THE INVENTION

The present invention relates generally to the data processing field, and more particularly, relates to a method and controller for implementing dynamic banding of a storage device, such as a Self Encrypting Device (SED) in a data storage system, such as a redundant array of independent drives (RAID), and a design structure on which the subject controller circuit resides.

DESCRIPTION OF THE RELATED ART

Storage adapters are used to connect a host computer system to peripheral storage I/O devices such as hard disk drives, solid state drives, tape drives, compact disk drives, and the like. Currently various high speed system interconnects are to connect the host computer system to the storage adapter and to connect the storage adapter to the storage I/O devices, such as, Peripheral Component Interconnect Express (PCIe), Serial Attach SCSI (SAS), Fibre Channel, and InfiniBand.

For many years now, hard disk drives (HDDs) or spinning drives have been the dominant storage I/O device used for the persistent storage of computer data which requires online access. Recently, solid state drives (SSDs) have become more popular due to their superior performance. Specifically, SSDs are typically capable of performing more I/Os per seconds (IOPS) than HDDs, even if their maximum data rates are not always higher than HDDs.

Encryption is becoming more popular for use within hard disk drives (HDDs) and solid state drive (SSDs) to provide security for data. An HDD or SSD which encrypts data stored on the media is known as a Self Encrypting Drive (SED). An earlier term used to describe such encrypting devices was Full Disk Encryption (FDE), where the entire (or nearly entire) area of the media was encrypted and secure. SEDs now allow multiple bands to be defined such that different areas of the device can be secure or non-secure.

A need exists for an effective method and controller for implementing dynamic banding of a storage device, such as a Self Encrypting Device (SED) in a data storage system. It is desirable to provide such dynamic banding of the storage device or SED that is used when placing the storage device into the data storage system, such as when building, adding a new SED or rebuilding a RAID.

As used in the following description and claims, the terms controller and controller circuit should be broadly understood to include an input/output (IO) adapter (IOA) and includes an IO RAID adapter connecting various arrangements of a host computer system and peripheral storage I/O devices including hard disk drives, solid state drives, tape drives, compact disk drives, and the like.

SUMMARY OF THE INVENTION

Principal aspects of the present invention are to provide a method and controller for implementing dynamic banding of a storage device, such as a Self Encrypting Device (SED) in a data storage system, and a design structure on which the subject controller circuit resides. Other important aspects of the present invention are to provide such method, controller, and design structure substantially without negative effects and that overcome many of the disadvantages of prior art arrangements.

In brief, a method and controller for implementing dynamic banding of a storage device, such as a Self Encrypting Device (SED) in a data storage array, and a design structure on which the subject controller circuit resides are provided. The controller dynamically identifies band boundaries for the storage device at the time a data storage array is created, when one or more devices are added into an existing data storage array, and when a replacement device is rebuilt into an exposed array, or an array with a failed device. A storage device band definition is provided based upon the identified band boundaries for the storage device.

In accordance with features of the invention, the band boundaries are selected based upon user selection of a secure storage area and a non-secure storage area.

In accordance with features of the invention, the data storage array includes a plurality of storage devices in a redundant array of independent drives (RAID) configuration coupled to the controller, and the band boundaries are selected based upon providing aligned parity stripes and aligned Atomic Parity Update (APU) data based upon a RAID level and number of drives in the RAID array.

In accordance with features of the invention, Atomic Parity Update (APU) data are separately kept on the device between the secure and non-secure areas of the SED.

In accordance with features of the invention, logical drives or volume sets are selectively allocated from either the secure or non-secure region of a RAID.

In accordance with features of the invention, a method is provided for allowing the use of a SED in a RAID including a selected size of secure area, and the selected size optionally including zero secure area.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and controller for implementing dynamic banding of a storage device, such as a Self Encrypting Device (SED) in a data storage array, and a design structure on which the subject controller circuit resides are provided.

Figure 1A:
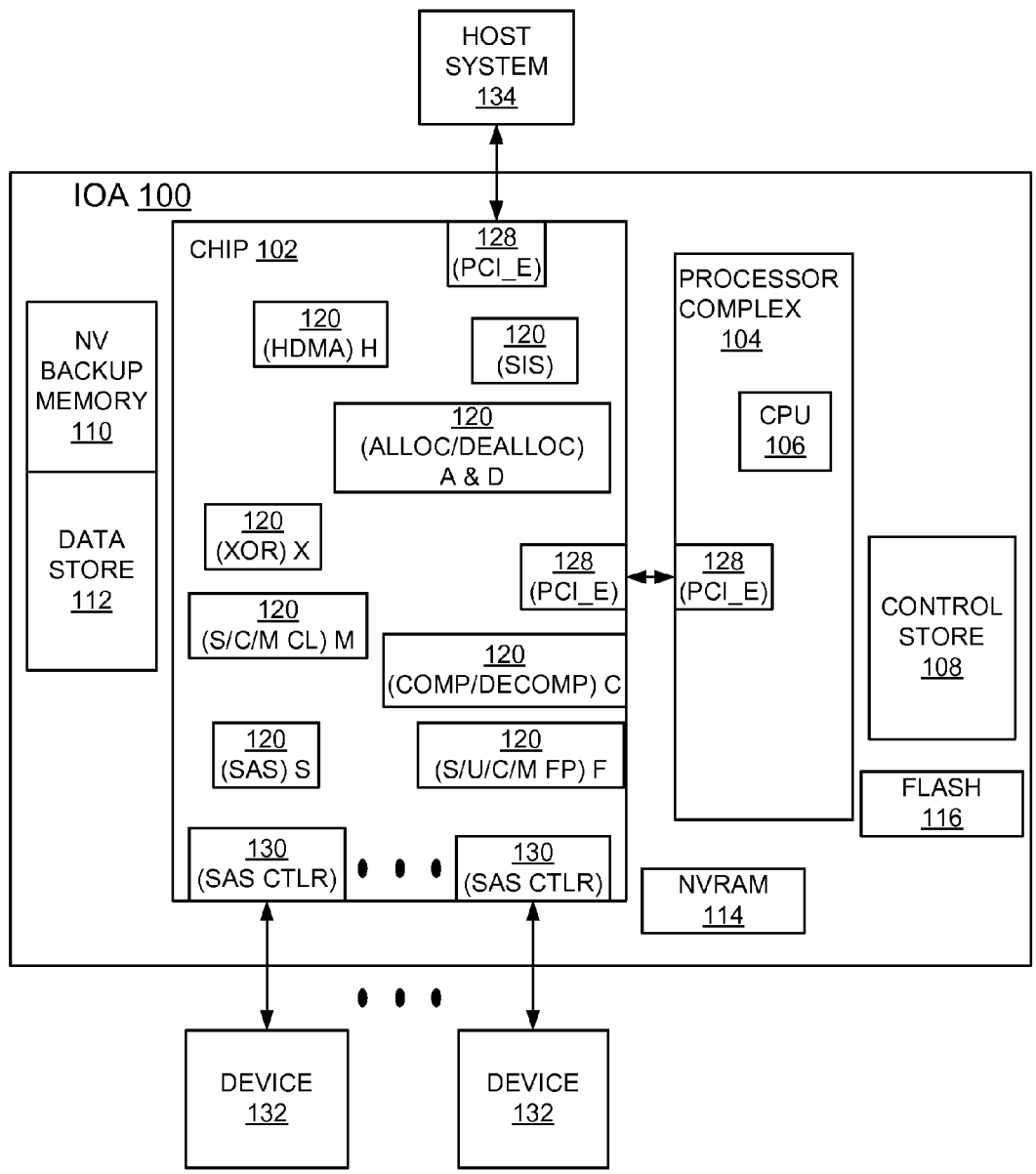
FIG. 1A is a schematic and block diagram illustrating an example system with a controller for implementing dynamic banding of a storage device, such as a Self Encrypting Device (SED) in a data storage array in accordance with the preferred embodiment.

Having reference now to the drawings, in FIG. 1A, there is shown an input/output adapter (IOA) or controller in accordance with the preferred embodiment generally designated by the reference character 100. Controller 100 includes a semiconductor chip 102 coupled to at least one processor complex 104 including one or more processors or central processor units (CPUs) 106. Controller 100 includes a control store (CS) 108, such as a dynamic random access memory (DRAM) proximate to the CPU 106 providing command block, work queue and event queue storage. Controller 100 includes a non-volatile (NV) backup memory 110 and a data store (DS) 112 providing data and scratch buffers for command block set up and processing, for example, performed by hardware. Controller 100 includes a non-volatile random access memory (NVRAM) 114, and a flash memory 116.

Controller semiconductor chip 102 includes a plurality of hardware engines 120, such as, a hardware direct memory access (HDMA) engine 120, a SIS engine 120, an allocate and de-allocate engine 120, an XOR or sum of products (SOP) engine 120, a Serial Attach SCSI (SAS) engine 120, a set/update/clear/mirror footprint (S/U/C/M FP) engine 120, and a compression/decompression (COMP/DECOMP) engine 120. Substantial conventional firmware function is moved to HW operations performed by the hardware engines 120. The hardware engines 120 are completely heterogeneous, and are fully extensible with chaining any engine to any other engine enabled.

As shown, controller semiconductor chip 102 includes a respective Peripheral Component Interconnect Express (PCIe) interface 128 with a PCIe high speed system interconnect between the controller semiconductor chip 102 and the processor complex 104, and a Serial Attach SCSI (SAS) controller 130 with a SAS high speed system interconnect between the controller semiconductor chip 102 and each of a plurality of storage devices 132, such as hard disk drives (HDDs) or spinning drives 132, and solid state drives (SSDs) 132. A host system 134 is connected to the controller 100, for example with a PCIe high speed system interconnect. It should be understood that an external processor complex 104 is not required and could be embedded in the controller semiconductor chip 102.

The controller semiconductor chip 102 and control store (CS) 108 implement dynamic banding of a storage device control such as illustrated and described with respect to FIGS. 3A, 3B, 5A, 5B, 6A, and 6B. Other structures in the CS 108 include FW structures and stacks.

In accordance with features of the invention, IOA controller 100 dynamically calculates band boundaries for the storage device 132 at the time a data storage array is created, when one or more devices are added into an existing data storage array, and when a replacement device is rebuilt into an exposed array, or an array with a failed device.

Figure 1B:
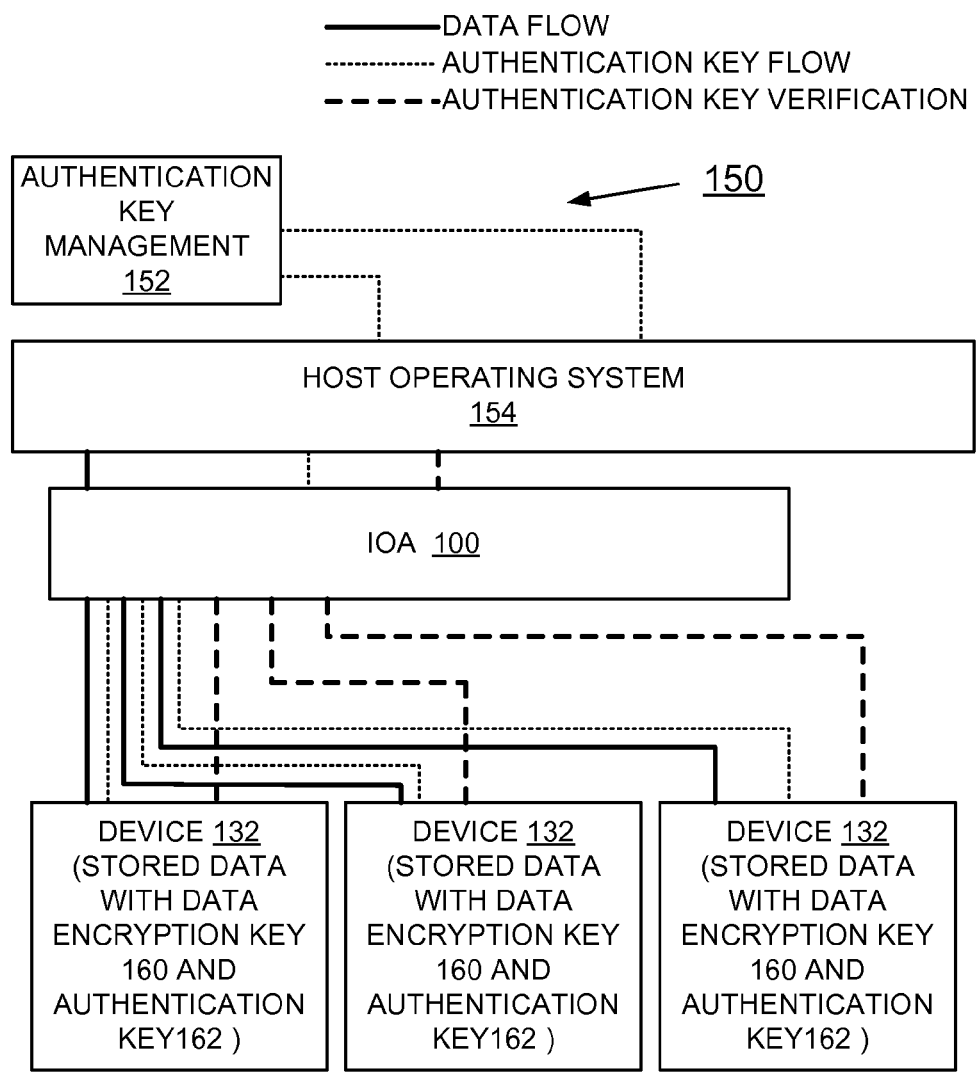
FIG. 1B is a schematic and block diagram illustrating an example key management and authentication key flow in the system of FIG. 1 with the controller for implementing dynamic banding of a storage device, such as a Self Encrypting Device (SED) in a data storage array in accordance with the preferred embodiment.
Figure 3A:
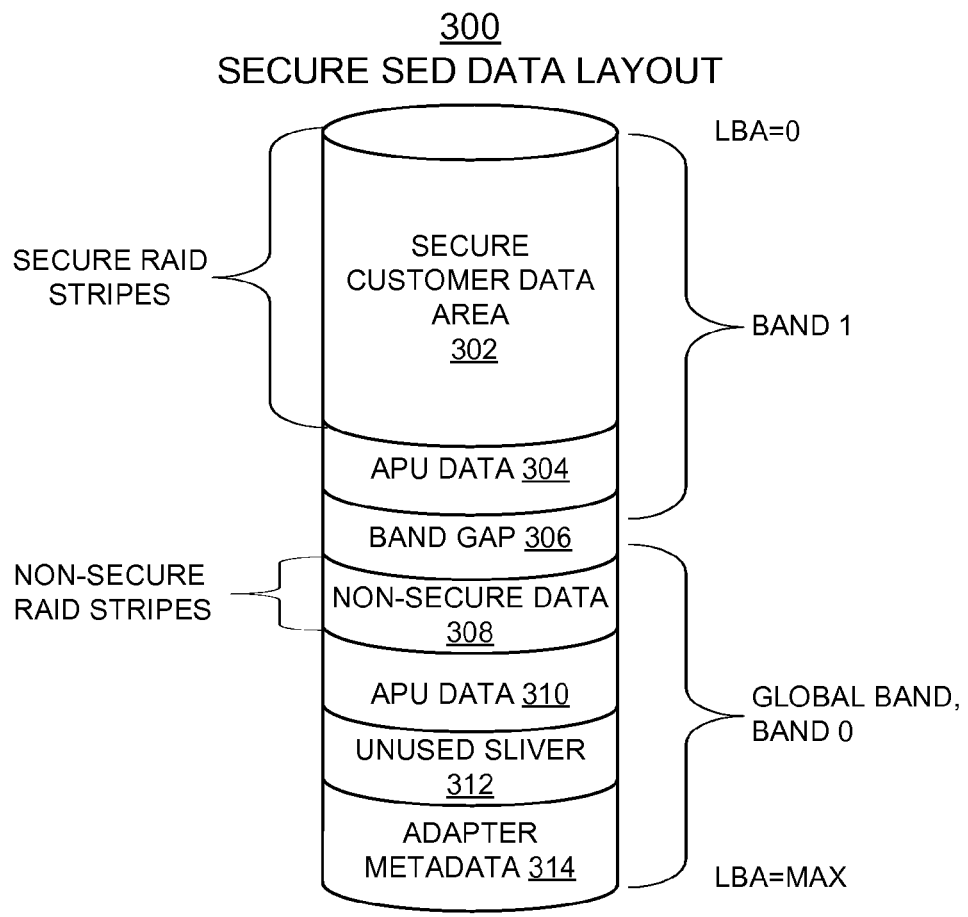
FIGS. 3A and 3B respectively illustrate a secure SED data layout and adapter metadata in accordance with the preferred embodiment.
Figure 3B:
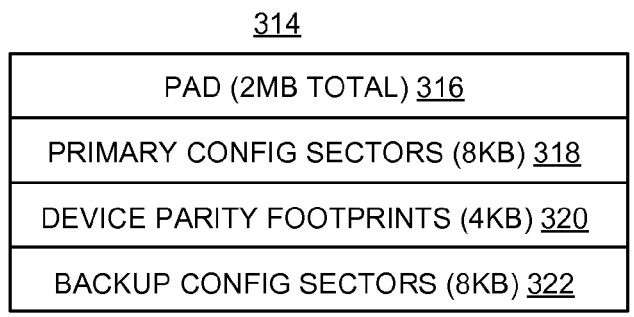
Figure 5A:
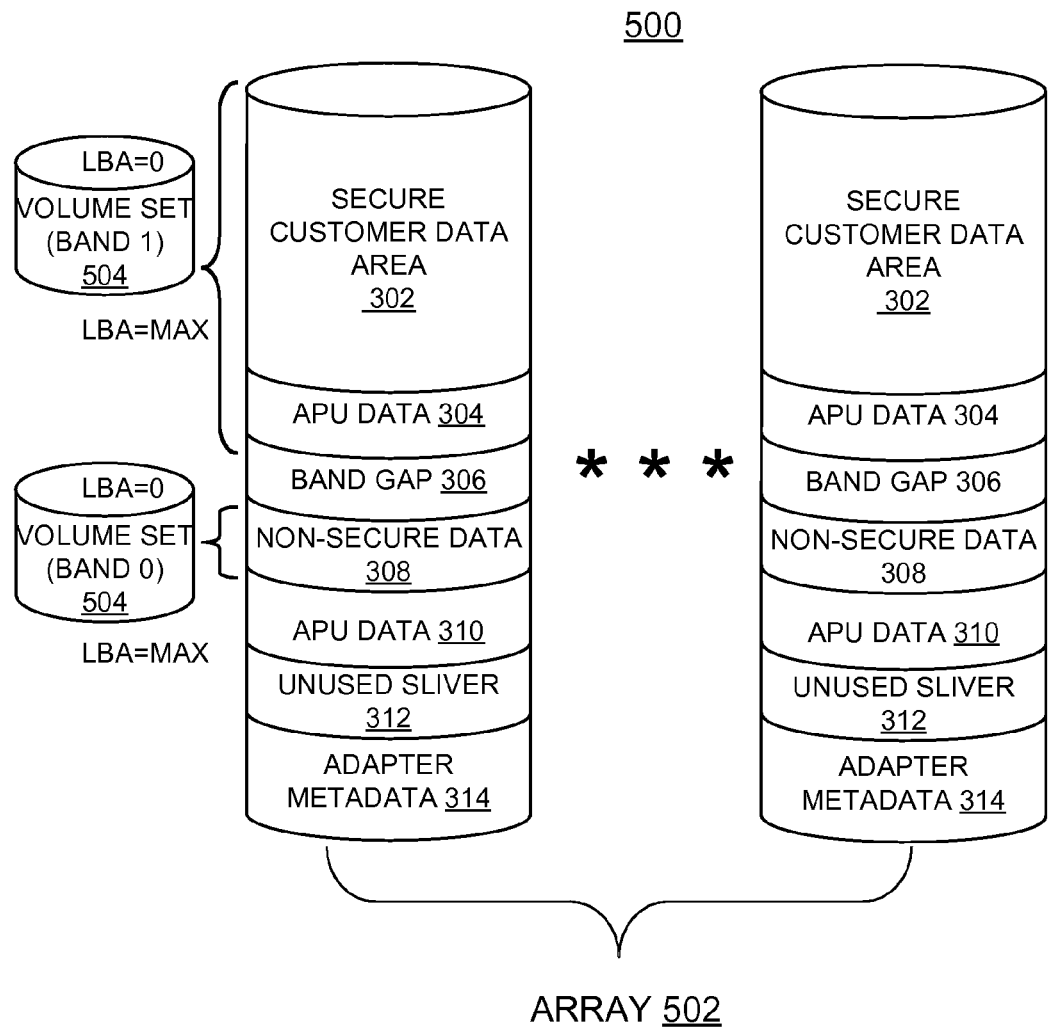
FIGS. 5A and 5B respectively illustrate example array layout of secure devices, such as SEDs with example bands and volume sets in accordance with the preferred embodiment.
Figure 5B:
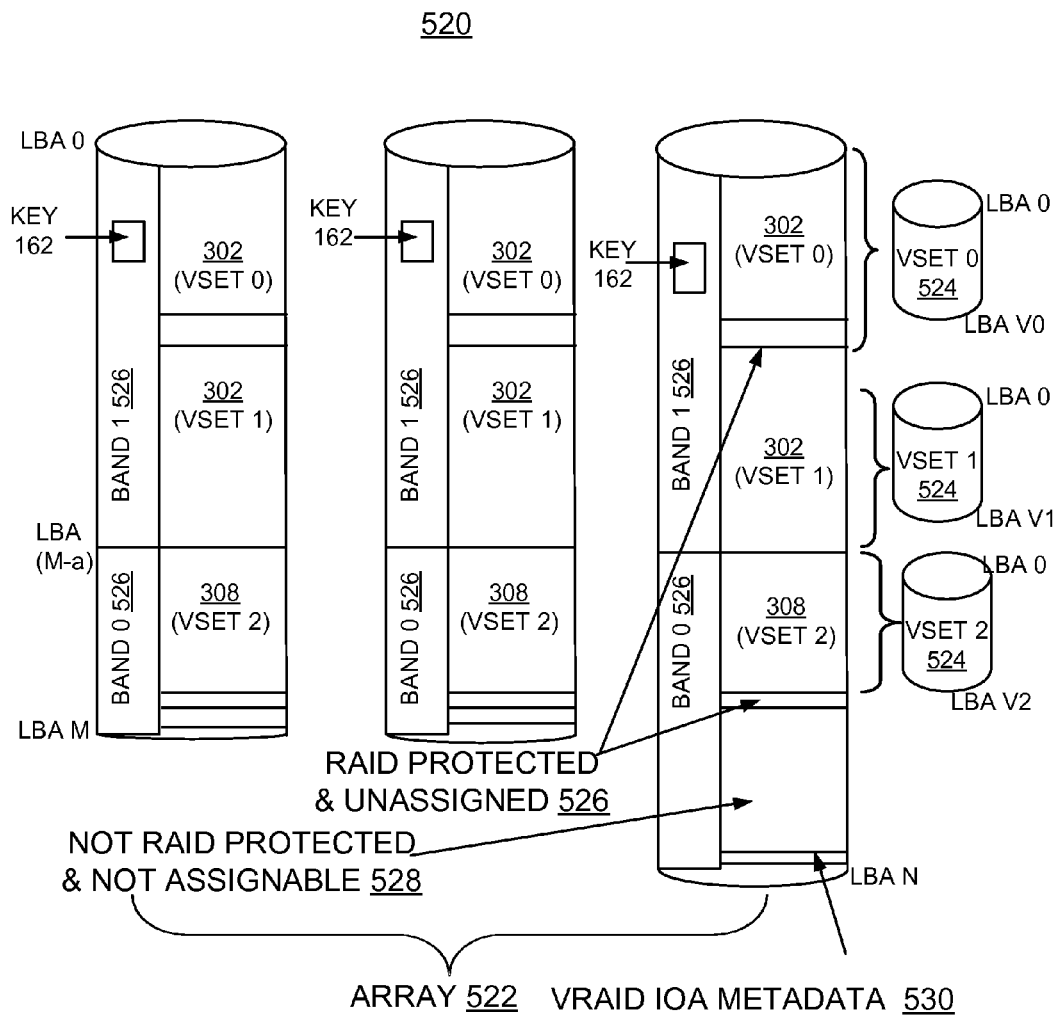

FIG. 1B illustrates example key management and authentication key flow generally designated by the reference character 150 with the IOA controller 100 for implementing dynamic banding of a storage device 132, such as a Self Encrypting Device (SED) for example as illustrated and described with respect to FIGS. 3A and 3B in a data storage array, such as illustrated and described with respect to FIGS. 5A and 5B in accordance with the preferred embodiment. An authentication key management function 152 is coupled to a host operating system 154 with authentication key flow between the authentication key management function 152 and the IOA controller 100 shown in dotted line. The IOA controller 100 applies the authentication key shown in dotted line to the multiple storage devices 132 having stored data with a data encryption key 160 and an authentication key 162. Data flow between the IOA controller 100 and the multiple storage devices 132 is shown in solid line and authentication key verification is illustrated in a dark dashed line.

It is important to understand that just because storage media of the respective multiple storage devices 132 is encrypted using the data encryption key 160 does not mean that it is secure. While the encryption key 160 is used to actually encrypt the data, for example, typically with a block cipher, an authentication key 162 is used to actually make the device 132 secure. The authentication key 162 is used to unlock the storage media such that it can be read and written. Each band of data on the device 132 may have its own unique authentication key 162 even though a common encryption key 160 is used for the entire device 132.

Figure 2A:
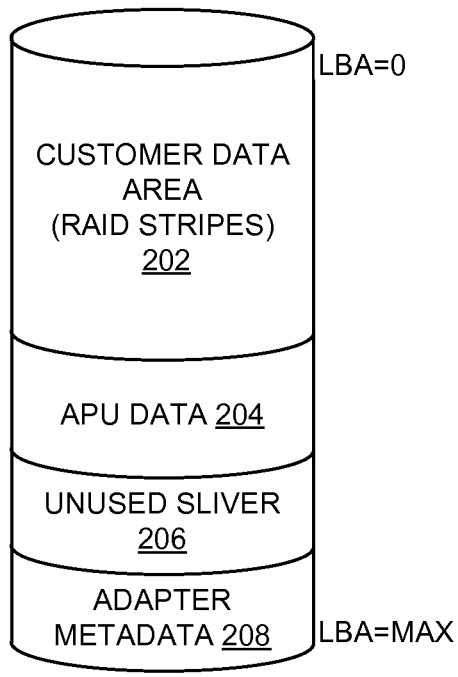
FIGS. 2A and 2B respectively illustrate a prior art device data layout and adapter metadata.
Figure 2B:
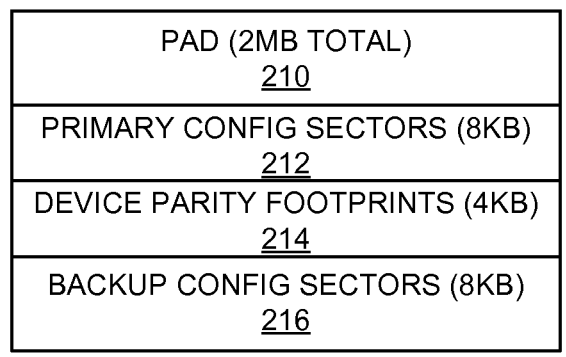

Referring to FIGS. 2A and 2B, in FIG. 2A a prior art example non-secure device data layout generally designated by reference character 200 is shown that includes a customer data area 202 storing RAID stripes, Atomic Parity Update (APU) data 204, an unused sliver 206 and adapter metadata 208. In FIG. 2B example layout of adapter metadata 208 is shown that includes a pad 210, such as 2 MB total, primary configuration (config) sectors 212, such as 8 KB, device parity footprints 214, such as 4 KB, and backup configuration sectors 216, such as 8 KB.

Referring to FIGS. 3A and 3B, there are shown an example secure Self Encrypting Device (SED) data layout generally designated by reference character 300 and an example layout of adapter metadata 314 in accordance with the preferred embodiment.

In FIG. 3A, a first secure band, BAND 1 includes a secure customer data area 302 storing secure RAID stripes, and Atomic Parity Update (APU) data 304. A band gap 306 separates the first secure band, BAND 1 from a global band, BAND 0 that includes a non-secure data area 308 storing non-secure RAID stripes, Atomic Parity Update (APU) data 310, an unused sliver 312, and adapter metadata 314. In FIG. 3B example layout of adapter metadata 314 of the secure SED data layout 300 is shown that includes a pad 316, such as 2

MB total, primary configuration (config) sectors 318, such as 8 KB, device parity footprints 320, such as 4 KB, and backup configuration sectors 322, such as 8 KB.

In accordance with features of the invention, IOA controller 100 provides one or more bands of secure data 302 on the SED 132 when other bands are non-secure 308. There are many reasons that it may be desired to have some bands of data on a SED be secure when other bands are not secure. For example, data and code required for a boot process may need to be accessed prior to an authentication key being available. Configuration information (e.g. metadata 314 illustrated in FIGS. 3A, and 3B) may need to be accessed prior to an authentication key being available. Some data simply does not need to be secure and does not deserve the complexity of an authentication key 162 illustrated in FIG. 1B.

In some prior art arrangements of SED, the SED is divided, in a predetermined fashion, into two bands with Band 0 which is not secure, and Band 1 which is secure, and Band 0 would typically contain RAID adapter and system metadata while Band 1 would contain customer data. Such prior art arrangements of SED proved to be very limiting for the following reasons that it could be very difficult to mix different capacities of SEDs into the same RAID array. Additional requirements were put on the SED supplier to put the predefined value into the Inquiry data. There was little flexibility in the ratio of secure vs. non-secure area of the SED. The dividing line between the secure and non-secure area of the SED often was not optimal for the parity stripe and Atomic Parity Update (APU) boundaries in the RAID array, which are often different depending upon RAID level and number of drives in the RAID array.

In accordance with features of the invention, IOA controller 100 implements a method of dynamically modifying the band definition on a Self Encrypting Drive (SED) when placing the drive into a RAID array, and a method of dynamically modifying the band definition on a SED when adding or rebuilding a new drive into an existing RAID array.

Figure 4:
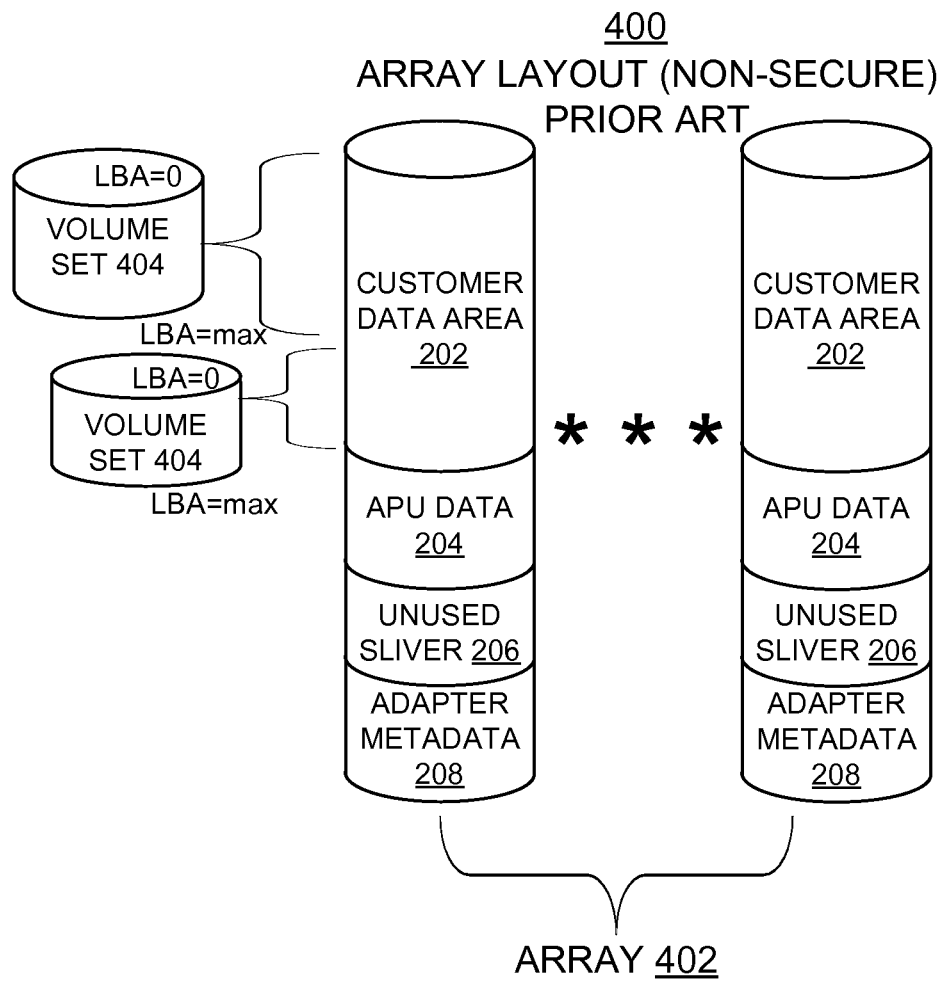
FIG. 4 illustrates a prior art array layout of prior art non-secure devices volume sets.

FIG. 4 illustrates a prior art array layout 400 including an array 402 of the prior art non-secure devices 200 including allocated logical drives illustrated volume sets 404.

Referring to FIGS. 5A and 5B respectively illustrate an example array layout generally designated by reference characters 500, 520 of multiple secure devices 300 or SEDs 132 with example bands and volume sets in accordance with the preferred embodiment.

In FIG. 5A, secure array layout 500 includes an array 502, such as a RAID 502, including allocated logical drives illustrated volume sets 504. Secure array layout 500 includes a first volume set 504 in non-secure Band 0 and another volume set 504, in secure Band 1, each extending between a predefined logical block address (LBA) of LBA=0 and LBA=MAX.

In FIG. 5B, secure array layout 520 includes an array 522, such as a RAID 522, including allocated logical drives illustrated a plurality of volume sets 524, VSET 0, VSET 1, in secure Band 1, 526 and VSET 2, in non-secure Band 0, 526. Secure array layout 520 includes an authentication key 162 received in secure Band 1, 526. Each of the volume sets 524, VSET 0, VSET 1, in secure Band 1, 526 and VSET 2, in non-secure Band 0, 526 extend between a predefined logical block address (LBA) of LBA 0 and respective LBA V0, LBA V1, and LBA V2.

Rather than predefining the dividing line between Band 0 and Band 1 at manufacturing time, the band boundaries, such as the dividing line between Band 0 and Band 1 in RAID 522 indicated at LBA (M-a), are dynamically calculated at the time that a RAID array is created, when devices are added into an existing RAID array, and when a replacement device 132 is rebuilt into an exposed RAID array (array with a failed drive).

In accordance with features of the invention, IOA controller 100 calculates or determines band boundaries, for example that are selected based upon a user selection for how much secure and non-secure area is desired. IOA controller 100 calculates or determines band boundaries, for example to ensure that both the parity stripes and APU data are nicely aligned, which is dependent upon the RAID level and number of drives in the RAID array.

In accordance with features of the invention, as shown in FIGS. 3A, and 5A, the band gap 306 or small unused area is provided between secure Band 1 and non-secure Band 0 in order to meet the optimal boundaries for the particular RAID array. Because APU data 304, 310 may often look like customer data, the APU data 304, 310 must be kept separate between the secure and non-secure areas of the array (i.e. kept with the its associated secure and non-secure data).

As shown in FIG. 5B, secure array layout 520 includes multiple SEDs 132 having a first storage capacity between LBA 0 and LBA M, and one larger SED having a first storage capacity between LBA 0 and LBA N. A respective RAID protected and unassigned area 526 is provided between VSET 0 and VSET 1 in secure Band 1, and with VSET 2 in non-secure Band 0. A larger unused area, such as not RAID protected and not assignable area 528 may exist when different capacity devices 132 are in the same RAID array 520, for example when a larger capacity SED 132 is used to replace a failed SED during a Rebuild operation. Because the SED may not allow Read or Write commands which cross the band boundaries, it is a great simplification to have the band boundary exist within an unused area, as shown in FIG. 5B. VRAID IOA metadata 530 is provided with VSET 2 in non-secure Band 0.

In accordance with features of the invention, IOA controller 100 enables separating Atomic Parity Update data 304, 310 maintained on the respective storage device or SED 132 between the secure and non-secure areas of Band 1, and Band 0 of the SED 132. IOA controller 100 allocates logical drives (i.e. volume sets 504) from either the secure or non-secure region of a RAID array, for example, as illustrated in the respective example array layout of FIGS. 5A and 5B. IOA controller 100 enables the use of a SED in a RAID array with or without any secure area. Additionally, there is no requirement to always have a secure area in a RAID array when SED devices 132 are being used. The illustrated secure area 302 of Band 1 can be set to zero, and thus the entire capacity of the SED used as a non-secure area. In this latter case, the SED devices could be mixed with non-SED devices in the same RAID, such as in the respective storage array 500, 520.

It should be understood that while illustrated examples of FIGS. 3A, 3B, 5A, and 5B, are shown with only two bands existing on each SED 132, many more than two bands optionally are created, for example, when different authentication keys per band are desired.

Figure 6A:
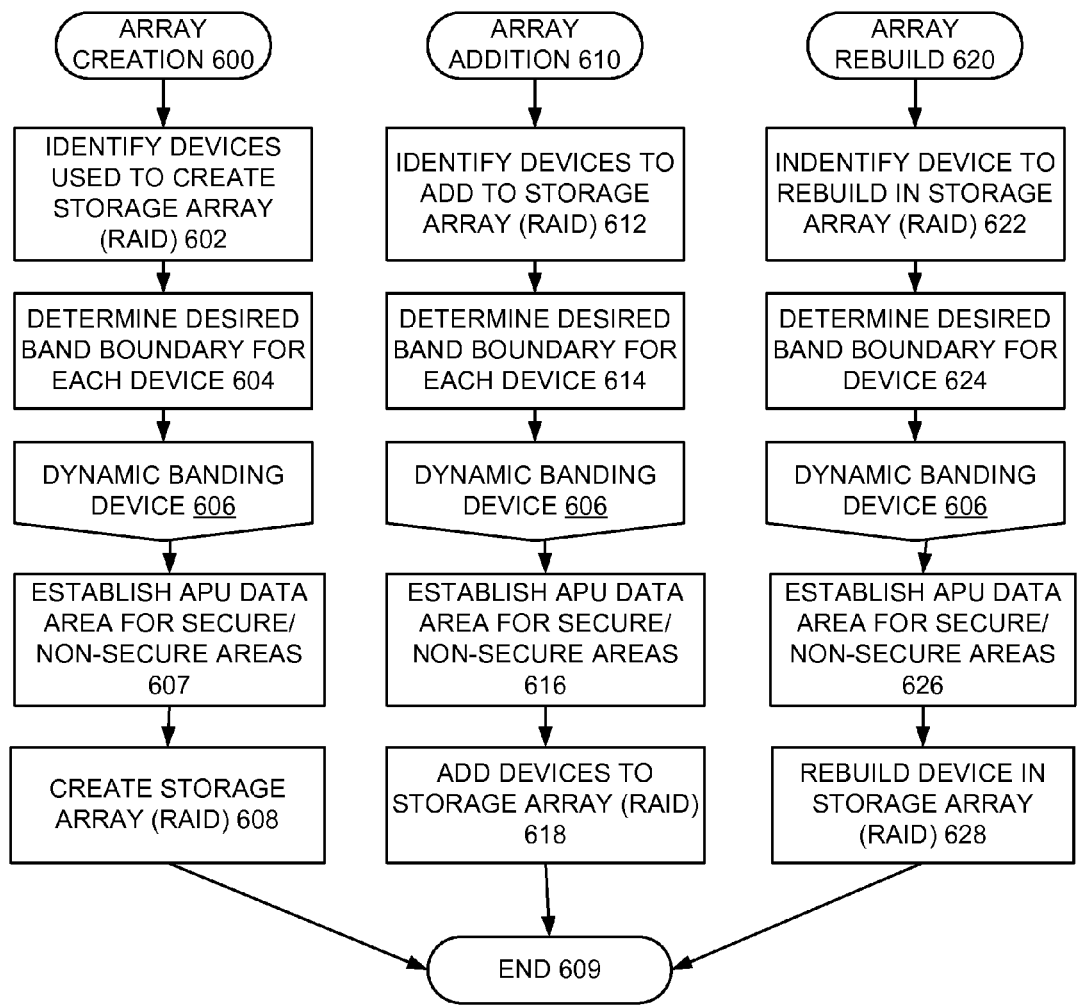
FIGS. 6A and 6B are flow charts illustrating exemplary steps for implementing dynamic banding of a storage device, such as a Self Encrypting Device (SED) in a data storage array in accordance with the preferred embodiment.
Figure 6B:
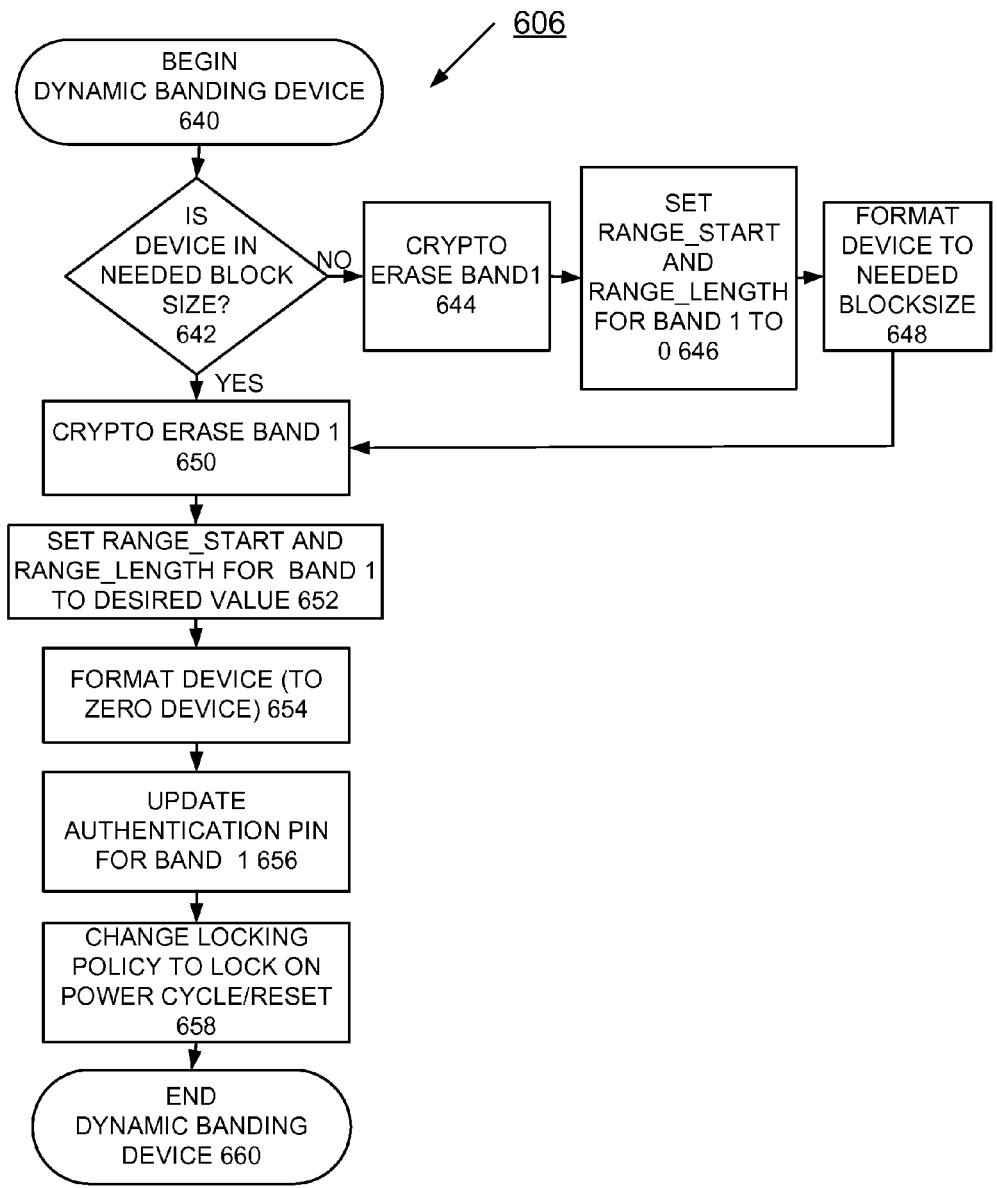

FIGS. 6A and 6B are flow charts illustrating exemplary steps for implementing dynamic banding of a storage device, such as a Self Encrypting Device (SED) in a data storage array in accordance with the preferred embodiment Referring to FIG. 6A, the operations begin as indicated at a block 600 for RAID array creation. Devices used to create the storage array or RAID are identified as indicated in a block 602. A desired band boundary is identified for each device as indicated in a block 604. A dynamic banding device routine is performed as indicated in a block 606, for example, as illustrated and described with respect to FIG. 6B. As indicated in a block 607, a respective APU data area is established for secure and non-secure areas. As indicated in a block 608, the RAID array is created. Then the sequential steps end as indicated in a block 609. Once the RAID array is created at block 608, the host 154 optionally creates logical drives (i.e. volume sets) from either the secure or non-secure region of a RAID array, for example, as shown in FIGS. 5A, and 5B. As shown in FIGS. 5A, and 5B, each defined logical drive never spans a band boundary.

Operations begin as indicated at a block 610 for RAID array addition. Devices to be added to the storage array or RAID are identified as indicated in a block 612. A desired band boundary is identified for each device as indicated in a block 614. The dynamic banding device routine is performed as indicated at block 606. As indicated in a block 616, a respective APU data area is established for secure and non-secure areas. As indicated in a block 618, the devices are added to the RAID array. Then the sequential steps end at block 609.

Operations begin as indicated at a block 620 for RAID array rebuild. A device to rebuild in the storage array or RAID is identified as indicated in a block 622. A desired band boundary is identified for the device as indicated in a block 624. The dynamic banding device routine is performed as indicated at block 606. As indicated in a block 626, a respective APU data area is established for secure and non-secure areas. As indicated in a block 628, the device is rebuilt in the RAID array. Then the sequential steps end at block 609.

Referring to FIG. 6B, the operations begin as indicated at a block 640 for the dynamic banding device routine 606. Checking whether the device is in a needed block size as indicated at a decision block 642. When determined device is not in a needed block size, the process used for dynamic banding the SED includes previously secure data (and often non-secure data) being cryptographically erased as indicated at a block 644. A range start and a range length for are set to zero for band 1 as indicated at a block 646. The device is formatted to the needed block size as indicated at a block 648.

As indicated in a block 650, when determined device is in a needed block size, the secure band 1 is cryptographically erased. A range start and a range length are set to desired values for band 1 as indicated at a block 652. As indicated in a block 654, the device is formatted, for example to zero the device. A Format Unit operation is typically used to zero the data on the device in order that the T10 Data Integrity Fields (T10 DIF) in each block of data are initialized and a RAID array can quickly be created, with parity data instantly in synchronization with the data it protects.

As indicated in a block 656, an authentication pin for band 1 is updated from the host operating system 154. The locking policy is changed to lock on power cycle reset as indicated in a block 658. Then the sequential dynamic banding device steps end as indicated in a block 660.

Figure 7:
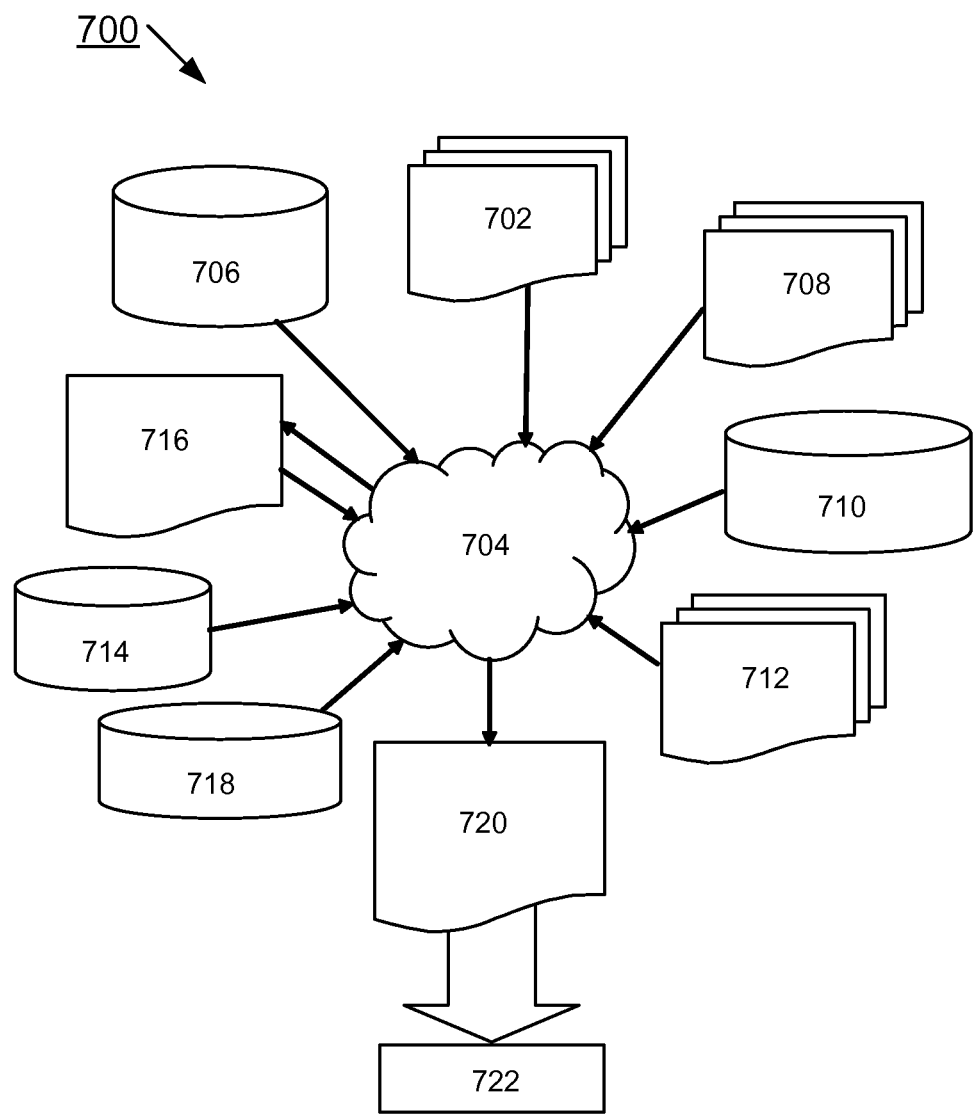
FIG. 7 is a flow diagram of a design process used in semiconductor design, manufacturing, and/or test.

FIG. 7 shows a block diagram of an example design flow 700. Design flow 700 may vary depending on the type of IC being designed. For example, a design flow 700 for building an application specific IC (ASIC) may differ from a design flow 700 for designing a standard component. Design structure 702 is preferably an input to a design process 704 and may come from an IP provider, a core developer, or other design company or may be generated by the operator of the design flow, or from other sources. Design structure 702 comprises controller 100 and performance state machine 200 in the form of schematics or HDL, a hardware-description language, for example, Verilog, VHDL, C, and the like. Design structure 702 may be contained on one or more machine readable medium. For example, design structure 702 may be a text file or a graphical representation of controller 100 and performance state machine 200. Design process 704 preferably synthesizes, or translates, controller 100 and performance state machine 200 into a netlist 706, where netlist 706 is, for example, a list of wires, transistors, logic gates, control circuits, I/O, models, etc. that describes the connections to other elements and circuits in an integrated circuit design and recorded on at least one of machine readable medium. This may be an iterative process in which netlist 706 is resynthesized one or more times depending on design specifications and parameters for the circuit.

Design process 704 may include using a variety of inputs; for example, inputs from library elements 708 which may house a set of commonly used elements, circuits, and devices, including models, layouts, and symbolic representations, for a given manufacturing technology, such as different technology nodes, 32 nm, 45 nm, 90 nm, and the like, design specifications 710, characterization data 712, verification data 714, design rules 716, and test data files 718, which may include test patterns and other testing information. Design process 704 may further include, for example, standard circuit design processes such as timing analysis, verification, design rule checking, place and route operations, and the like. One of ordinary skill in the art of integrated circuit design can appreciate the extent of possible electronic design automation tools and applications used in design process 704 without deviating from the scope and spirit of the invention. The design structure of the invention is not limited to any specific design flow.

Design process 704 preferably translates an embodiment of the invention as shown in FIGS. 1A, 3A, 3B, 5A, 5B, 6A, and 6B along with any additional integrated circuit design or data (if applicable), into a second design structure 720. Design structure 720 resides on a storage medium in a data format used for the exchange of layout data of integrated circuits, for example, information stored in a GDSII (GDS2), GL1, OASIS, or any other suitable format for storing such design structures. Design structure 720 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A, 3A, 3B, 5A, 5B, 6A, and 6B. Design structure 720 may then proceed to a stage 722 where, for example, design structure 720 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A data storage system comprising:
a controller for implementing dynamic banding of a self encrypting storage device when placing the self encrypting storage device in a data storage array;
said controller dynamically identifying band boundaries for the self encrypting storage device at the time of a data storage array being created, and
said controller providing a storage device band definition for the self encrypting storage device based upon the dynamically identified band boundaries for the self encrypting storage device; said storage device band definition including at least one secure band including a secure data area and at least one non-secure band including a non-secure data area.

2. The data storage system as recited in claim 1 includes said controller dynamically identifying band boundaries for a self encrypting storage device at the time a self encrypting storage device is added into the data storage array.

3. The data storage system as recited in claim 1 includes said controller dynamically identifying band boundaries for a self encrypting storage device at the time a replacement device is rebuilt into the data storage array including a failed device.

4. The data storage system as recited in claim 1 wherein said controller dynamically identifies band boundaries for the self encrypting storage device based upon user selected values for secure area and a non-secure area.

5. The data storage system as recited in claim 1 wherein said data storage array includes a redundant array of independent drives (RAID) and wherein said controller dynamically identifies band boundaries for the self encrypting storage device based upon a number of drives in said RAID and a RAID level value.

6. The data storage system as recited in claim 1 includes said controller separating Atomic Parity Update (APU) data kept on the self encrypting storage device between said secure and non-secure areas.

7. The data storage system as recited in claim 1 wherein said data storage array includes a redundant array of independent drives (RAID) and said RAID includes a plurality of self encrypting storage devices.

8. The data storage system as recited in claim 7 includes said controller storing non-secure RAID stripes in a first area of a non-secure band and said controller storing secure RAID stripes in a second area of a secure band.

9. The data storage system as recited in claim 8 includes said controller allocating volume sets from either the secure or non-secure area of said RAID.

10. The data storage system as recited in claim 7 includes said controller dynamically identifying band boundaries based upon providing aligned parity stripes and aligned Atomic Parity Update (APU) data depending upon a RAID level and number of drives in the RAID array.

11. The data storage system as recited in claim 7 includes said controller allowing use of a self encrypting storage device having a selected size of zero secure area.

12. The data storage system as recited in claim 1 wherein said controller providing a storage device band definition for the self encrypting storage device includes said controller cryptographically erasing the self encrypting storage device.

13. The data storage system as recited in claim 12 includes said controller formatting the self encrypting storage device.

14. The data storage system as recited in claim 1 wherein said controller providing a storage device band definition for the self encrypting storage device includes said controller updating an authentication key of a secure band of the storage device.

15. The data storage system as recited in claim 14 includes said controller changing a locking policy to lock on power cycle reset.

16. A method for implementing dynamic banding of self encrypting storage devices in a data storage array comprising:
providing a controller for implementing dynamic banding of a self encrypting storage device when placing the self encrypting storage device in a data storage array;
said controller dynamically identifying band boundaries for the self encrypting storage device at the time a data storage array being created, and
said controller providing a storage device band definition for the self encrypting storage device based upon the dynamically identified band boundaries for the storage device; said storage device band definition including at least one secure band including a secure data area and at least one non-secure band including a non-secure data area.

17. The method as recited in claim 16 includes said controller dynamically identifying band boundaries for a self encrypting storage device at the time a self encrypting storage device is added into the data storage array.

18. The method as recited in claim 16 includes said controller dynamically identifying band boundaries for a self encrypting storage device at the time a replacement device is rebuilt into the data storage array including a failed device.

19. The method as recited in claim 16 wherein said controller dynamically identifies band boundaries for the self encrypting storage device based upon user selected values for said secure area and said non-secure area.

20. The method as recited in claim 16 wherein said data storage array includes a redundant array of independent drives (RAID) and said controller dynamically identifies band boundaries for the self encrypting storage device based upon a number of drives in said RAID and a RAID level value.

21. The method as recited in claim 20 includes said controller allocating volume sets from either said secure area or said non-secure area of said RAID.

22. The method as recited in claim 16 wherein said data storage array includes a plurality of Self Encrypting Devices (SEDs) and said controller separating Atomic Parity Update data kept on the self encrypting storage device between a secure area and a non-secure area of the self encrypting storage device.

23. A design structure embodied in a non-transitory machine readable medium used in a design process, the design structure comprising:
a controller circuit tangibly embodied in the non-transitory machine readable medium used in the design process, said controller circuit for dynamic banding of a self encrypting storage device when placing the self encrypting storage device in a data storage array, said controller circuit comprising:
said controller dynamically identifying band boundaries for the self encrypting storage device at the time of a data storage array being created, and
said controller providing a storage device band definition for the self encrypting storage device based upon the dynamically identified band boundaries for the storage device; said storage device band definition including at least one secure band including a secure data area and at least one non-secure band including a non-secure data area wherein the design structure, when read and used in the manufacture of a semiconductor chip produces a chip comprising said controller circuit.

* * * * *